US012711978B2

(12) United States Patent

Zhang et al.

(10) Patent No.: US 12,711,978 B2

(45) Date of Patent: Aug. 18, 2026

(54) METHOD AND APPARATUS FOR TASK-DRIVEN SPEECH SEPARATION BY LEVERAGING SPEAKER DISTANCE INFORMATION

(71) Applicant: TENCENT AMERICA LLC, Palo Alto, CA (US)

(72) Inventors: Hao Zhang, Columbus, OH (US); Meng Yu, Palo Alto, CA (US); Yong Xu, Palo Alto, CA (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 228 days.

(21) Appl. No.: 18/760,823

(22) Filed: Jul. 1, 2024

(65) Prior Publication Data

US 2026/0004796 A1 Jan. 1, 2026

(51) Int. Cl.
*G10L 21/0272* (2013.01)
*G10L 25/30* (2013.01)

(52) U.S. Cl.
CPC .......... *G10L 21/0272* (2013.01); *G10L 25/30* (2013.01)

(58) Field of Classification Search
CPC ..... G10L 21/0272; G10L 25/30; G10L 25/00; G06N 20/00
See application file for complete search history.

(56) References Cited

U.S. PATENT DOCUMENTS

2021/0158799 A1* 5/2021 Zhang ...................... G10L 15/02
2023/0116052 A1* 4/2023 Eskimez ............. G10L 21/0208 704/223
2024/0013774 A1* 1/2024 Zhang ...................... G10L 17/18
2025/0029626 A1* 1/2025 Zhang ................. G10L 21/0208

FOREIGN PATENT DOCUMENTS

CN 116434764 A * 7/2023 ......... G10L 21/0208
CN 118506772 A * 8/2024 ............. G10L 25/45
EP 3816999 B1 * 11/2022 ............. G10L 25/30

OTHER PUBLICATIONS

International Search Report dated Jun. 30, 2025 in International Application No. PCT/US2025/022493.
Written Opinion dated Jun. 20, 2025 in International Application No. PCT/US2025/022493.

* cited by examiner

*Primary Examiner* — Mohammad K Islam
(74) *Attorney, Agent, or Firm* — Sughrue Mion, PLLC

(57) ABSTRACT

A method includes receiving a mixture signal comprising at least a first speaker, a second speaker, and background noise, the first speaker having a first distance to a microphone that outputs the mixture signal, the second speaker having a second distance to the microphone; training one or more neural networks to output a target channel and an interference channel by: inputting, into the one or more neural networks, the mixture signal and a task ID associated with one of the first speaker and the second speaker as a target speaker; determining a loss function based on the first distance and the second distance; and updating the neural network based on the loss function.

18 Claims, 5 Drawing Sheets

METHOD AND APPARATUS FOR TASK-DRIVEN SPEECH SEPARATION BY LEVERAGING SPEAKER DISTANCE INFORMATION

FIELD

The disclosure generally relates to task-driven speech separation by leveraging speaker distance information.

BACKGROUND

Speech separation is a critical task in many audio processing applications, including live streaming, public speaking events, teleconferencing, and voice-controlled systems. The ability to isolate and enhance the speech of a specific speaker from a mixture of overlapping voices and background noises is essential for improving the clarity and intelligibility of the target speech.

Single-channel speech separation methods are particularly challenging because they do not have access to spatial information, such as the direction or distance of the sound sources, which multi-channel methods can leverage to improve separation performance. Furthermore, traditional single-channel separation techniques typically focus solely on segregating speech signals without providing information about which speaker is the target and which is the interference. This limitation makes it difficult to ensure that the primary speaker's voice is correctly identified and enhanced, especially in dynamic and noisy environments.

SUMMARY

According to an aspect of the disclosure, a method performed by at least one processor, comprises: receiving a mixture signal comprising at least a first speaker, a second speaker, and background noise, the first speaker having a first distance to a microphone that outputs the mixture signal, the second speaker having a second distance to the microphone; training one or more neural networks to output a target channel and an interference channel by: inputting, into the one or more neural networks, the mixture signal and a task ID associated with one of the first speaker and the second speaker as a target speaker; determining a loss function based on the first distance and the second distance; and updating the neural network based on the loss function.

According to an aspect of the disclosure, an apparatus comprises: at least one memory configured to store program code; and at least one processor configured to read the program code and operate as instructed by the program code, the program code including: receiving code configured to cause the at least one processor to receive a mixture signal comprising at least a first speaker, a second speaker, and background noise, the first speaker having a first distance to a microphone that outputs the mixture signal, the second speaker having a second distance to the microphone; training code configured to cause the at least one processor to train one or more neural networks to output a target channel and an interference, the training code comprising: first inputting code configured to cause the at least one processor to input, into the one or more neural networks, the mixture signal and a task ID associated with one of the first speaker and the second speaker as a target speaker; determining code configured to cause the at least one processor to determine a loss function based on the first distance and the second distance; and updating code configured to cause the at least one processor to update the neural network based on the loss function.

According to an aspect of the disclosure, a non-transitory computer readable medium, having instructions stored therein, which when executed by a processor cause the method to execute a method comprising: receiving a mixture signal comprising at least a first speaker, a second speaker, and background noise, the first speaker having a first distance to a microphone that outputs the mixture signal, the second speaker having a second distance to the microphone; training one or more neural networks to output a target channel and an interference channel by: inputting, into the one or more neural networks, the mixture signal and a task ID associated with one of the first speaker and the second speaker as a target speaker; determining a loss function based on the first distance and the second distance; and updating the neural network based on the loss function.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
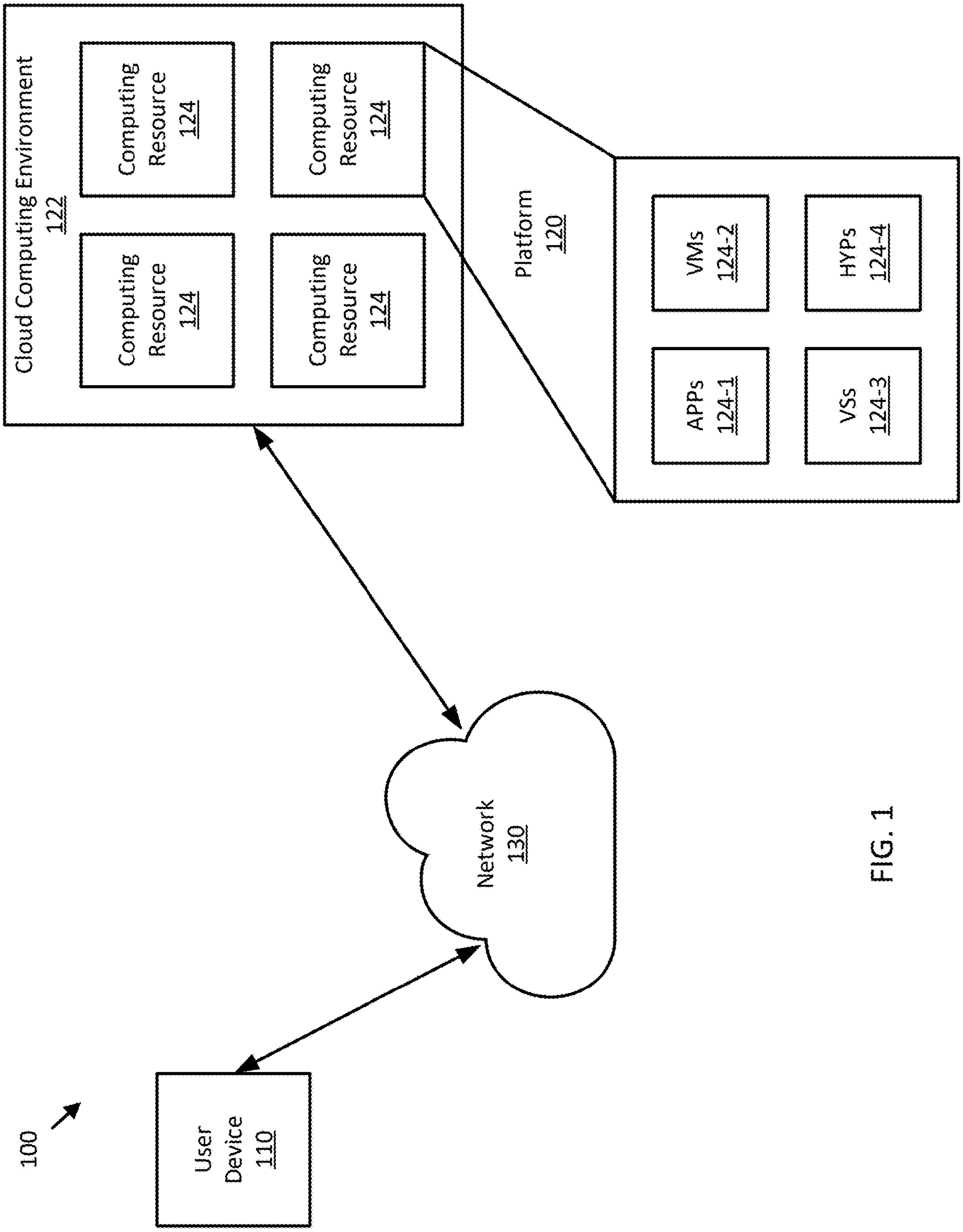
FIG. 1 is a diagram of an environment in which methods, apparatuses, and systems described herein may be implemented, according to embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Embodiments of the present disclosure are directed to methods and systems for separating speech signals from a single-channel microphone recording. The embodiments of the present disclosure are particularly applicable in scenarios such as live streaming and public speaking events, where it is essential to isolate the speech of a primary speaker from interfering background speakers. The proposed method leverages the distance between the speakers and the microphone to enhance speech separation, utilizing task ID for targeted extraction and a weighted training loss based on speaker distances during model training. Single-channel separation methods are highly versatile and can be adapted for devices with multiple microphones, making them widely applicable in various consumer and professional audio devices.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications (APPs) 124-1, one or more virtual machines (VMs) 124-2, virtualized storage (VSS) 124-3, one or more hypervisors (HYPs) 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system (OS). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
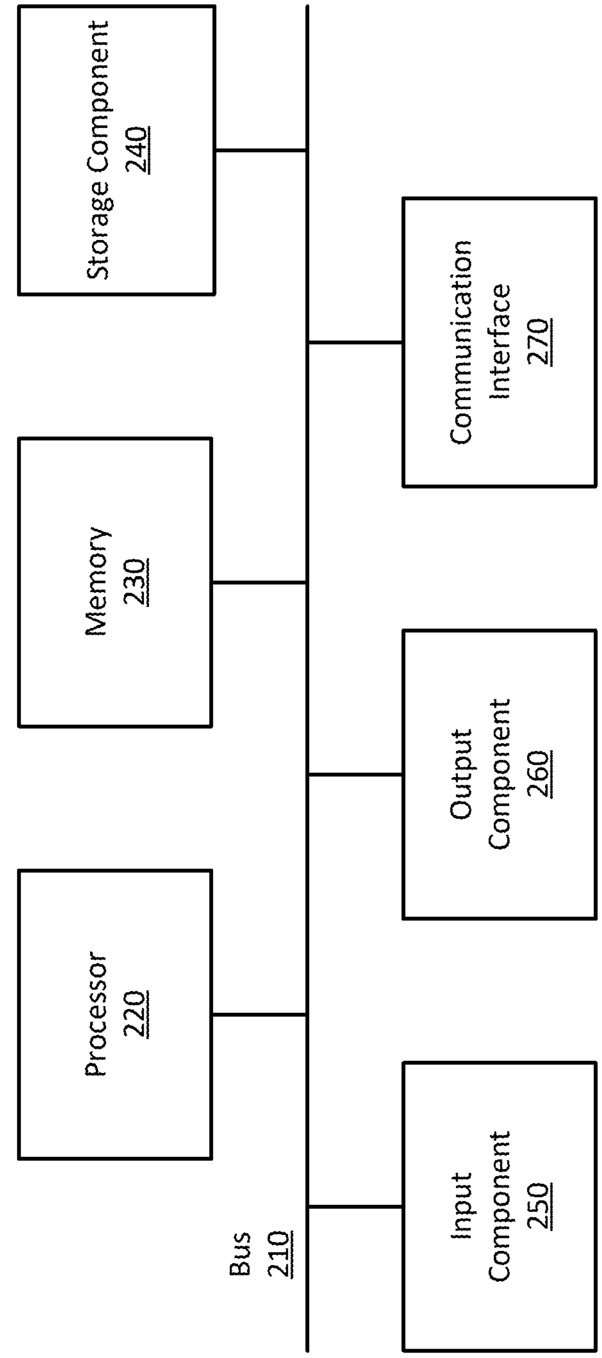
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

In applications such as live streaming and public speaking, it is crucial to isolate the speech of the main speaker from any interfering voices to ensure clear communication. Traditional single-channel separation techniques fall short in providing the necessary contextual information, such as the distance of speakers from the microphone, which is vital for targeted speech extraction in these scenarios.

To address these challenges, there is a need for an advanced method that leverages both the distance between the speakers and the microphone and task-specific parameters to enhance speech separation in single-channel recordings. By incorporating task-ID, which indicates whether to extract the nearer or farther speaker, and a distance-aware weighted loss function, the proposed method provides a more flexible and informative solution for speech separation.

The embodiments of the present disclosure leverage neural networks to extract target speech from a single-channel recording. In one or more examples, during model training, the system outputs two channels: a target channel and an interference channel. The embodiments utilize embedding layers to extract embeddings from a task ID, where 0 may indicate extracting the nearer speech and 1 may indicate extracting the farther speech. In one or more examples, 0 may indicate extracting the farther speech and 1 may indicate extracting the nearer speech. This task embedding may be used as an additional input for training the neural network.

According to one or more embodiments, the input to the neural network consists of the task-ID embeddings and the mixture signal, and the output comprises two channels of separated speech. To better guide the model in extracting the target speech, a distance-aware weighted loss function may be used for training the model. This approach ensures a more accurate separation of the target speech from the interference based on the specified task.

In one or more examples, given a microphone recording containing a mixture of background noise and speech signals from one or more speakers, the task of this project is to extract the target speech based on the distance between the speaker and the microphone, either extracting the nearest or the farthest one. The microphone signal y(t) may be represented as:

$$y(t) = v(t) + \sum_{i=1}^{N} s_i(t), \quad \text{Eq. (1)}$$

where v(t) denotes background noise, $s_i(t)$ denotes speech from speaker i, and N is the total number of speakers.

Figure 3:
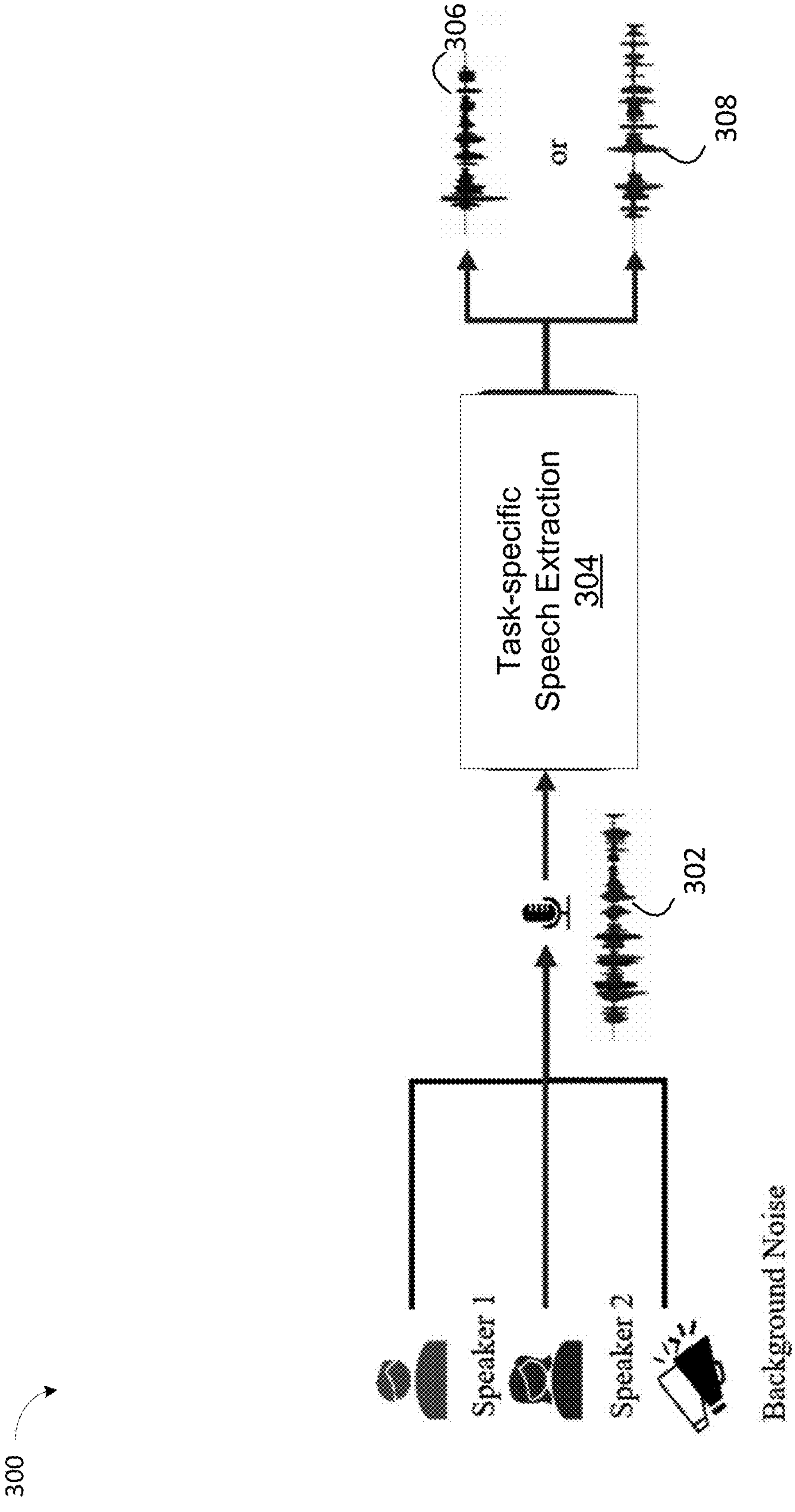
FIG. 3 is an illustration of task-driven speech separation, according to embodiments.

FIG. 3 illustrates an example system model 300 with two speakers. A mixture signal 302 may correspond to y(t) in Eq. (1), which includes a mixture of a speech signal from Speaker 1, a speech signal from Speaker 2, and background noise. The mixture signal 302 may be input into a task-specific speech extraction model 304, that is trained to estimate the speech signal of Speaker 1 306 and the speech signal of Speaker 2 308. In one or more examples, Speaker 1 may be closer to a microphone than Speaker 2, where the signal 306 is the target speech signal and the signal 308 is the interference speech signal. In one or more examples, Speaker 1 may be farther away from the microphone than Speaker 2, where the signal 306 is the target speech signal and the signal 308 is the interference speech signal.

Figure 4:
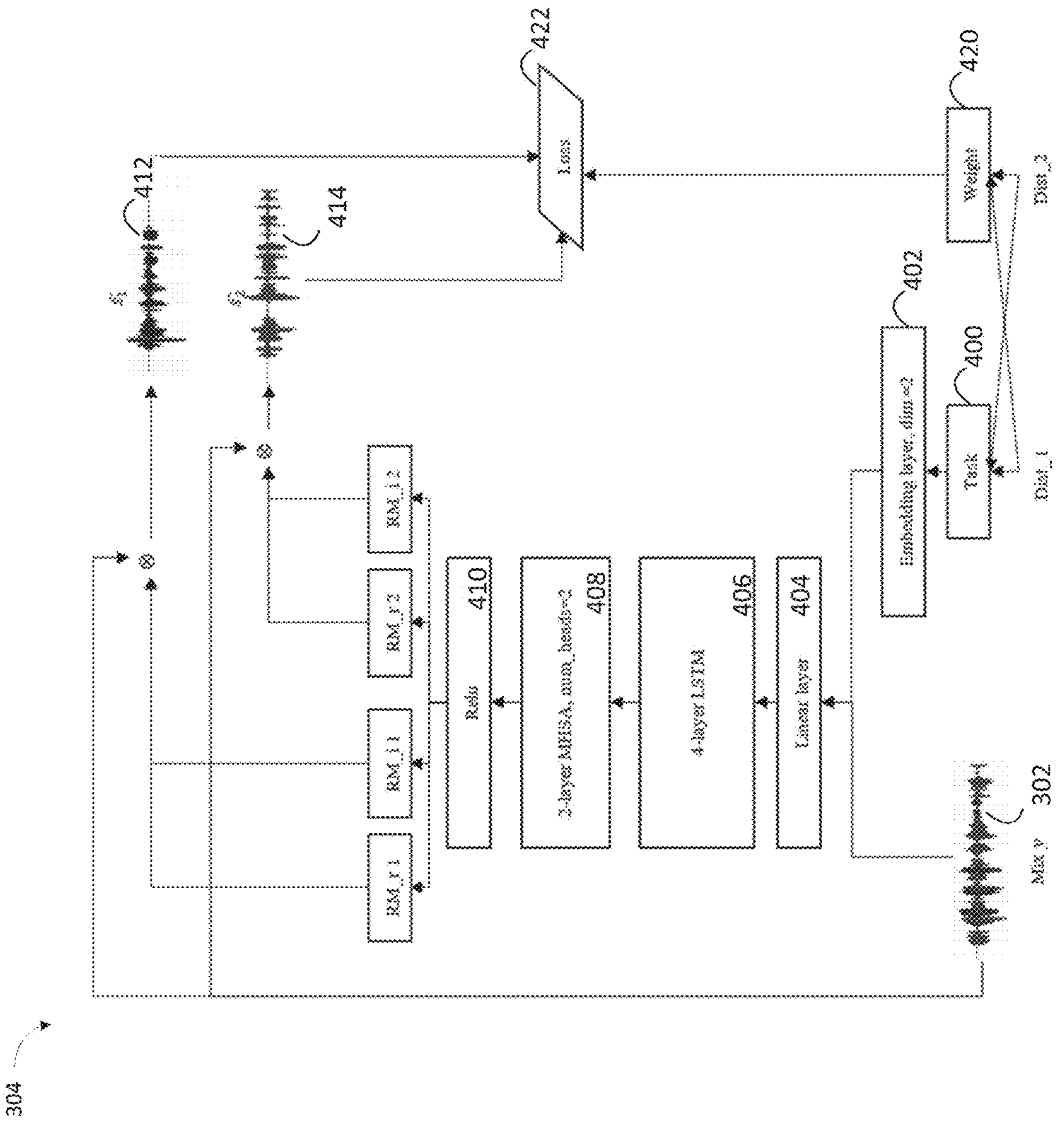
FIG. 4 is a flowchart of a system for performing task-driven speech separation, according to embodiments.

According to one or more embodiments, to achieve the goal of distance-based speaker separation, a model with one or more neural networks is utilized and provided a task ID as an additional input for model training. An example of a detailed training strategy and network structure is illustrated in FIG. 4. The model illustrated in FIG. 4 may correspond to the task-specific extraction model 304 for two speakers. In one or more examples, for training, the distance information of both speakers during model training, denoted as Dist_1 and Dist_2, is known. Using this distance information, the distances may be compared and the task ID and the corresponding output channel may defined as follows:

$$\text{Task } ID = \begin{cases} 0, \text{ if extract nearest speaker} \\ 1 \text{ if extract farest speaker} \end{cases} \quad \text{Eq. (2)}$$

In one or more examples, a first channel is used to estimate the target speech and a second channel is used to estimate the interference speech, denoted as $s_1$ and $s_2$, respectively.

In one or more examples, the mixture signal 302 is first converted to the short-time Fourier transform (STFT). In one or more examples, a task module 400 receives distances Dist_1 and Dist_2, where the output of the task module 400 is provided to an embedding layer 402.

In one or more examples, the output of the embedding layer 402 may be concatenated with the mixture signal. For example, if the model 304 is trained with the nearest speaker as the target speech signal, the output of the embedding layer may be Task ID=0, in accordance with Eq. (2). In one or more examples, if the model 304 is trained with the farthest speaker as the target speech signal, the output of the embedding layer may be Task ID=1, in accordance with Eq. (2).

In one or more examples, the concatenated input is passed through a linear layer 404 for feature reduction. In one or more examples, the linear layer 404 may receive an input vector that is mapped to an output vector using a set of learnable parameters. The linear layer 404 may multiply the input vector by a weight matrix and add a bias (e.g., Y=XW+b). The weight matrix and bias vector may be learnable parameters that are updated during the training process to optimize performance of the model. The weight matrix may determine the linear transformation that is applied to the input vector, while the bias vector adjusts the output of the transformation to a desired range.

The output of the linear layer 404 may produce a compressed feature that may then be fed into a 4-layer long short-term memory (LSTM) network 406, followed by a 2-layer multi-head self-attention (MHSA) network 408, and followed by a rectified linear unit (Relu) 410 to estimate the real and imaginary ratio masks (RMs) for channels one and two, respectively. In FIG. 4, “r” and “i” may denote real and imaginary parts, respectively.

In one or more examples, these ratio masks are then multiplied with the mixture signal to obtain estimates of the two speech signals including the estimated target speech signal 412 and the estimated interference speech signal 414. For example, the mixture signal 302 may be multiplied by masks RM_r1 and RM_i1 to obtain the estimated target speech signal 412, and the mixture signal 302 may be multiplied by masks RM_r2 and RM_i2 to obtain the estimated interference signal 414.

In one or more examples, the LSTM network 406 may be a type of recurrent neural network (RNN). The LSTM network 406 may be a short-term memory for RNN that may last thousands of timesteps, and is suitable for speech recognition and speech activity detection. In one or more examples, the LSTM network 406 may comprise a cell, an input gate, an output gate, and a forget gate. The cell may remember values over arbitrary time intervals and the three gates regulate the flow of information into and out of the cell. Forget gates may decide what information to discard from a previous state by assigning a previous state, compared to a current input, a value between 0 and 1. A (rounded) value of 1 may mean to keep the information, and a value of 0 may mean to discard the information. The input gates may decide which pieces of new information to store in the current state, using the same system as forget gates. Output gates may control which pieces of information in the current state to output by assigning a value from 0 to 1 to the information, considering the previous and current states. Selectively outputting relevant information from the current state allows the LSTM network 406 to maintain useful, long-term dependencies to make predictions, both in current and future time-steps.

In one or more examples, the relu 410 may be an activation function defined as follows:

$$f(x) = x^+ = \max(0, x) = \frac{x + |x|}{2} = \begin{cases} x & \text{if } x > 0, \\ 0 & \text{otherwise} \end{cases}, \quad \text{Eq. (3)}$$

In Eq. (3), x may be an input neuron. The relu 410 may be a ramp function.

In one or more examples, although LSTM and MHSA are utilized as the network components, these components may be replaced by any neural network architectures known to one of ordinary skill in the art suitable for performing a speech separation task.

Estimating a two-channel output jointly is beneficial because, compared to estimating only the target speaker, simultaneously estimating both the target and interference speakers provides more information for the model. This additional information helps to improve the overall estimation performance and rectifies the estimating accuracy of the target channel.

According to one or more embodiments, to better guide the model training, a distance-aware weighted loss function may be utilized. In most use cases, such as live streaming, users are usually more concerned about the quality of the nearest speaker's speech. Accordingly, adding this distance-aware loss helps the model focus more on extracting the target speaker, which is the nearest speaker in this case. In one or more examples, this weight 420 may be calculated as follows:

$$w = \text{dist\_2}/(dist_1 + dist2) \quad \text{Eq. (4)}$$

The loss function 422 may be defined as follows:

$$\text{Loss} = wMAE(s_1, \hat{s}_1) + (1 - w)MAE(s_2, \hat{s}_2) \quad \text{Eq. (5)}$$

In Eq. (5), MAE may correspond to mean absolute error. In one or more example, the output of the loss function 422 may be utilized to update any one of the networks 404, 406, 408, and 410. For example, if the loss function is above a loss threshold, one or more weights or parameters in the networks 404, 406, 408, and 410 may be adjusted to minimize the loss function.

Figure 5:
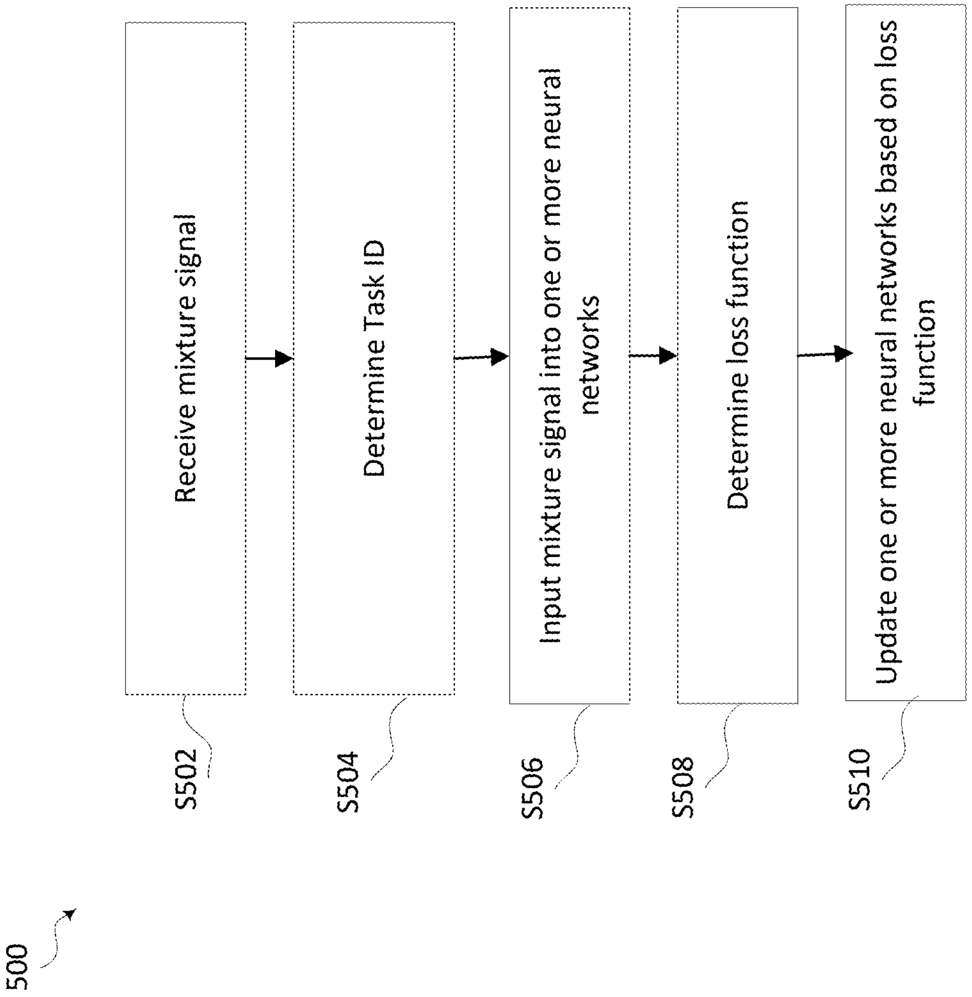
FIG. 5 is a flowchart for performing task-driven speech separation, according to embodiments.

FIG. 5 illustrates a flowchart of an example process 500 of training one or more neural network for estimating a target channel and an interference channel. The process 500 may be implemented by the processor 220 (FIG. 2).

The process may start at operation S502 where a mixture signal is received. The mixture signal may be mixture signal 302 received from a microphone. The mixture signal may include a speech signal of a first speaker at a first distance from the microphone, a speech signal of a second speaker at a second distance from the microphone, and a background noise signal.

The process proceeds to operation S504 where a Task ID is determined. For example, the first and second distances may be input into the task module 400, and an output of the task module 400 is provided to an embedding layer 402. In one or more examples, the first distance is less than the second distance (e.g., first speaker is closer to the microphone than the second speaker. If the system is trained to select the nearest speaker as the target channel, the embedding layer 402 may output Task ID=0, in accordance with Eq. (2). If the system is trained to select the farthest speaker as the target channel, the embedding layer 402 may output Task ID=1, in accordance with Eq. (2).

The process proceeds to operation S506, where the mixture signal is input into one or more neural networks. For example, the mixture signal may be concatenated with the task ID an input into the one or more neural networks comprising linear layer 404, LSTM network 406, MHSA network 408, and Relu 410. The output of the relu 410 may provide real and imaginary ratio masks of the target channel to estimate a target speech signal and real and imaginary ratio masks of the interference channel to estimate an interference speech signal.

The process proceeds to operation S508 to determine a loss function such as the loss function in Eq. (5). The process proceeds to operation S510 to update the one or more neural networks based on the loss function. For example, if the output of the loss function is greater than a loss threshold, one or more weights or parameters of the one or more neural networks may be adjusted to minimize the output of the loss function.

The embodiments of the present disclosure result in task-driven speaker separation that provides a more flexible and informative solution for speech separation. The embodiments of the present disclosure result in joint estimation of target and interference channels that enhances separation performance. The embodiments of the present disclosure provide distance-aware training loss that guides the model to focus more on the target speech.

The embodiments of the present disclosure effectively separates target speech from interferences based on the provided task-ID, allowing for task-driven speech separation that enhances flexibility and provide more information about the separated results. By jointly estimating two channels, the model of the embodiments of the present disclosure better extracts the target speech, facilitating faster convergence. The distance-aware loss function in the embodiments of the present disclosure significantly improves the quality of the extracted speech, making the embodiments of the present disclosure a robust and practical solution for various real-world scenarios. Although the system is designed to extract either the nearer or farther speech, it is typically more common to extract the nearer one in practical applications.

The proposed methods disclosed herein may be implemented by processing circuitry (e.g., one or more processors or one or more integrated circuits). In one example, the one or more processors execute a program that is stored in a non-transitory computer-readable medium to perform one or more of the proposed methods.

The techniques described above may be implemented as computer software using computer-readable instructions and physically stored in one or more computer-readable media.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method performed by at least one processor, the method comprising:

receiving a mixture signal comprising at least a first speaker, a second speaker, and background noise, the first speaker having a first distance to a microphone that outputs the mixture signal, the second speaker having a second distance to the microphone;

training one or more neural networks to output a target channel and an interference channel by:

converting the mixture signal to a short-time Fourier transform (STFT);

extracting, from an embedding layer that receives the first distance and the second distance, a task ID associated with one of the first speaker and the second speaker as a target speaker;

concatenating the task ID with the mixture signal converted to the STFT to generate a concatenated signal;

inputting, into the one or more neural networks, the concatenated signal to output the target channel and the interference channel;

determining a loss function based on the first distance and the second distance; and updating one or more parameters of the neural network based on the loss function such that outputting the target channel and the interference channel minimizes the loss function.

2. The method according to claim 1, wherein the one or more neural networks comprise a linear layer, and the training the one or more neural networks further comprises:

inputting, into the linear layer, the concatenated signal to generate a linear output signal.

3. The method according to claim 2, wherein the one or more neural networks comprise a long short-term memory (LSTM) network, and the training the one or more neural networks further comprises:

inputting, into the LSTM network, the linear output signal to generate an output LSTM signal.

4. The method according to claim 3, wherein the one or more neural networks comprise a multi-head self-attention (MHSA) network, and the training the one or more neural networks further comprise:

inputting, into the MHSA network, the output LSTM signal to estimate a first real ratio mask of the target channel, a first imaginary ratio mask of the target channel, a second real ratio mask of the interference channel, and a second imaginary ratio mask of the interference channel;

multiplying the mixture signal with the first real ratio mask of the target channel and the first imaginary ratio mask of the target channel to obtain an estimated target speech signal; and multiplying the mixture signal with the second real ratio mask of the interference channel and the second imaginary ratio mask of the interference channel to obtain an estimated interference speech signal.

5. The method according to claim 4, wherein the loss function is based on a weight determined as one of the first distance and the second distance divided by a sum of the first distance and the second distance.

6. The method according to claim 5, wherein the loss function is defined as a sum of (i) the weight multiplied by a mean absolute error between a target speech signal in the mixture signal and the estimate of the target speech signal and (ii) one minus the weight multiplied by a mean absolute error between an interference speech signal in the mixture signal and the estimate of the interference speech signal.

7. The method according to claim 1, wherein the first distance is less than the second distance.

8. The method according to claim 7, wherein the task ID selects the first speaker.

9. The method according to claim 8, wherein the task ID selects the second speaker.

10. An apparatus comprising:

at least one memory configured to store program code; and at least one processor configured to read the program code and operate as instructed by the program code, the program code including:

receiving code configured to cause the at least one processor to receive a mixture signal comprising at least a first speaker, a second speaker, and background noise, the first speaker having a first distance to a microphone that outputs the mixture signal, the second speaker having a second distance to the microphone;

training code configured to cause the at least one processor to train one or more neural networks to output a target channel and an interference channel, the training code comprising:

converting code configured to cause the at least one processor to convert the mixture signal to a short-time Fourier transform (STFT);

extracting code configured to cause the at least one processor to extract, from an embedding layer that receives the first distance and the second distance, a task ID associated with one of the first speaker and the second speaker as a target speaker;

concatenating code configured to cause the at least one processor to concatenate the task ID with the mixture signal converted to the STFT to generate a concatenated signal;

first inputting code configured to cause the at least one processor to input, into the one or more neural networks, the concatenated signal to output the target channel and the interference channel;

determining code configured to cause the at least one processor to determine a loss function based on the first distance and the second distance; and updating code configured to cause the at least one processor to update one or more parameters of the neural network based on the loss function such that outputting the target channel and the interference channel minimizes the loss function.

11. The apparatus according to claim 10, wherein the one or more neural networks comprise a linear layer, and the training code further comprises:

second inputting code configured to cause the at least one processor to input, into the linear layer, the concatenated signal to generate a linear output signal.

12. The apparatus according to claim 11, wherein the one or more neural networks comprise a long short-term memory (LSTM) network, and the training code further comprises:

third inputting code configured to cause the at least one processor to input, into the LSTM network, the linear output signal to generate an output LSTM signal.

13. The apparatus according to claim 12, wherein the one or more neural networks comprise a multi-head self-attention (MHSA) network, and the training code further comprises:

fourth inputting code configured to cause the at least one processor to input, into the MHSA network, the output LSTM signal to estimate a first real ratio mask of the target channel, a first imaginary ratio mask of the target channel, a second real ratio mask of the interference channel, and a second imaginary ratio mask of the interference channel;

first multiplying code configured to cause the at least one processor to multiply the mixture signal with the first real ratio mask of the target channel and the first imaginary ratio mask of the target channel to obtain an estimated target speech signal; and second multiplying code configured to cause the at least one processor to multiply the mixture signal with the second real ratio mask of the interference channel and the second imaginary ratio mask of the interference channel to obtain an estimated interference speech signal.

14. The apparatus according to claim 13, wherein the loss function is based on a weight determined as one of the first distance and the second distance divided by a sum of the first distance and the second distance.

15. The apparatus according to claim 14, wherein the loss function is defined as the a sum of (i) the weight multiplied by a mean absolute error between a target speech signal in the mixture signal and the estimate of the target speech signal and (ii) one minus the weight multiplied by a mean absolute error between an interference speech signal in the mixture signal and the estimate of the interference speech signal.

16. The apparatus according to claim 10, wherein the first distance is less than the second distance.

17. The apparatus according to claim 16, wherein the task ID selects the first speaker.

18. A non-transitory computer readable medium, having instructions stored therein, which when executed by a processor cause the method to execute a method comprising:

receiving a mixture signal comprising at least a first speaker, a second speaker, and background noise, the first speaker having a first distance to a microphone that outputs the mixture signal, the second speaker having a second distance to the microphone;

training one or more neural networks to output a target channel and an interference channel by:

converting the mixture signal to a short-time Fourier transform (STFT);

extracting, from an embedding layer that receives the first distance and the second distance, a task ID associated with one of the first speaker and the second speaker as a target speaker;

concatenating the task ID with the mixture signal converted to the STFT to generate a concatenated signal;

inputting, into the one or more neural networks, the concatenated signal to output the target channel and the interference channel;

determining a loss function based on the first distance and the second distance; and updating one or more parameters of the neural network based on the loss function such that outputting the target channel and the interference channel minimizes the loss function.

* * * * *